Figure 1:
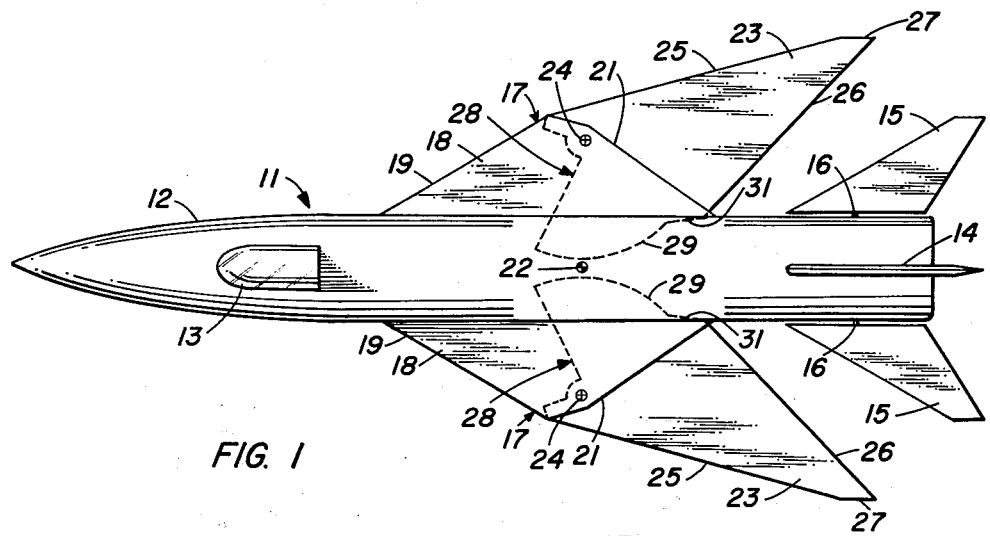

Sept. 11, 1962 W. J. ALFORD, JR., ET AL 3,053,484
VARIABLE SWEEP WING CONFIGURATION
Filed July 7, 1960

INVENTORS
WILLIAM J. ALFORD, JR.
EDWARD C. POLHAMUS

BY
ATTORNEYS

United States Patent Office 3,053,484
Patented Sept. 11, 1962

3,053,484
VARIABLE SWEEP WING CONFIGURATION
William J. Alford, Jr., Hampton, and Edward C. Polhamus, Newport News, Va., assignors to the United States of America as represented by the Administrator of the National Aeronautics and Space Administration
Filed July 7, 1960, Ser. No. 41,455
4 Claims. (Cl. 244—43)
(Granted under Title 35, U.S. Code (1952), sec. 266)

The invention described herein may be manufactured and used by or for the Government of the United States of America for governmental purposes without the payment of any royalties thereon or therefor.

This invention relates generally to aerial vehicles, and more particularly to supersonic airplanes having variable sweep wings.

The invention is considered to be particularly useful for application to aircraft having fairly high supersonic speed capabilities on the order, say, of Mach 2.5. The airframe configuration requirements for efficient supersonic flight, however, especially in the indicated range and higher, are simply not compatible with the configuration requirements for efficient low speed flight, takeoff and climb, or descent and landing. The optimum wing planform for low speed flight, and conventional takeoff and landing, is considered to include a long span, narrow chord wing having a low sweep angle. The total lift developed by a lifting wing, other factors such as angle of attack and dynamic pressure being equal, is substantially proportional to aspect ratio, which is defined as the square of the span of the wing divided by the surface area thereof. It will be immediately apparent, therefore, that a long narrow wing may develop many multiples of the total lift obtainable with a short broad wing of the same plan area, thereby reducing the angle of attack required for landing and takeoff. Moreover, the drag due to lift is reduced as the aspect ratio is increased, thereby providing high aerodynamic efficiency for subsonic cruise. The high aspect ratio wing, of course, permits relatively short takeoff and landing roll, as well as low speed climb to altitude, thereby making feasible the use of small and relatively rough airports, which may be located even in fairly densely populated and built up areas. For transonic and supersonic flight, however, highly swept low aspect ratio wings are considered preferable, since aerodynamic drag may be greatly reduced thereby, and other advantages enumerated hereinafter may also be obtained. During supersonic cruise at high altitudes, at which fuel consumption per mile traveled is minimized, the highly swept wing configuration develops a comparatively low drag coefficient while developing the required lift coefficient. It has been experimentally shown that lift/drag ratios of from 6.0 to 8.0 may be obtained with the highly swept wing at supersonic high altitude cruise, making such flights economically feasible even in the case of commercial transport aircraft. The highly swept wing configuration is also preferred for supersonic flight at low levels, where the combination of high dynamic pressure and the high frequency end of the gust spectrum may establish the structural strength requirements of an aircraft, since the gust loads imposed on a highly swept wing are much smaller than on a more or less straight wing, due to a smaller change in lift force resulting from change in angle of attack. This result is due to the fact that a moving aircraft experiences atmospheric turbulence only as sudden changes in angle of attack, which may be said to be the direction of the resultant of the vertical component of gust velocity and the horizontal component of aircraft velocity. It is, of course, generally undesirable to operate supersonic aircraft at low levels; an exception being the case of military aircraft operating over enemy territory where low altitude flight is considered to reduce the vulnerability of the aircraft to attack and to increase the chances of avoiding radar detection; due to the fact that extensive shock wave damage may be experienced by buildings and like structures adjacent the flight path of an aircraft flying at supersonic speeds below an altitude of, say, 100 feet.

It will now be apparent, from the foregoing discussion, that an aircraft of the swept wing type designed solely on the basis of high supersonic, high performance flight simply will not perform satisfactorily for subsonic cruise, takeoff and landing. Even present day low supersonic aircraft are designed with aspect ratios higher than that considered optimum for supersonic cruising flight in order to make takeoff and landing feasible, and the takeoff ground roll distance requirements of around 10,000 feet for these aircraft are nearing an upper limit. These low supersonic aircraft must also climb to cruise altitude at subsonic speeds to prevent heavy shock wave ground damage, at the expense of increased fuel consumption, since the relatively low aspect ratio of the wings thereof results in increased drag due to lift while in the climb. The severity of this problem may be exemplified by a typical fuel consumption record of a low supersonic swept wing transport on a transatlantic flight, where normally 30 percent or more of the total fuel will be expended in takeoff and climb to cruise altitude at subsonic speeds.

The most promising line of attack taken in the past to overcome the configuration incompatibility problem outlined hereinbefore involves in flight variation of wing planform geometry, and particularly simultaneous variation of both wing sweep and aspect ratio. Intensive investigation of this concept began with the extensive flight testing early in the previous decade by the United States Government of one such variable aspect ratio aircraft. This aircraft was provided with inflight variable sweep wings which were movable in their entirety about pivot points closely proximate to the wing planform plane of symmetry. As the sweep angle of these wings was increased, the aerodynamic center of the wings moved rearwardly with respect to the wing pivot points, making necessary the provision of mechanism for moving the pivot points forward and keeping the aerodynamic center within a few inches of the rear of the airplane center of gravity to maintain a manageable margin of static stability. The complete flight test program of this aircraft revealed unsatisfactory stability and control characteristics, however, and it was determined that such elaborate and massive control mechanism for varying wing sweep and translating the wing pivots would be required to convert the design into a useful operational aircraft that performance penalties due to added weight resulting from the use thereof would more than offset the advantages derivable from the use of variable wing sweep. The test program on this aircraft demonstrated the feasibility of in-flight wing rotation, however, and also pointed out the desirability of eliminating the need for wing translation. Subsequently, other variable sweep wing planforms were investigated both in this country and abroad by persons concerned with producing a fully operational aircraft design capable of obtaining the advantages, while avoiding the penalties, associated with variable wing sweep. One of the more extensive efforts made to overcome the problems exposed by the flight test program of the hereinbefore mentioned variable sweep wing aircraft was conducted aboard, and resulted in what is known as the "Swallow" aircraft configuration concept. This configuration, in planform, consists essentially of a long narrow delta having a leading edge sweep on the order of 75 degrees, and is characterized by a large triangular cutout area adjacent the rear of the delta. The base of this cutout area is substantially of the same width as the base of the delta, and the apex thereof is located on the planform axis of symmetry of the basic delta at about the longitudinal midpoint thereof, thereby defining a swallow tail configuration. Since substantially all of the lift on a delta configuration is developed along the leading edges, this cutout eliminates a "dead" area of the wing which would otherwise contribute heavily to total drag while producing very little lift at high supersonic speeds. The two long pointed tails of the "Swallow" configuration are hinged to the delta forebody thereof so that they may be swept forward to a position substantially at right angles to the flight path to provide a greatly increased aspect ratio of low speed flight. This configuration is further characterized by the installation of the propulsion engines in nacelle pods positioned on the variable sweep wing portions at approximately 75% of the wing semispan in the low aspect ratio attitude, and by the provision of means for pivoting these pods in the horizontal plane to maintain a fore and aft direction upon change in wing sweep angle and also for pivoting the pods about a horizontal axis normal to the line of flight to obtain pitching control when the pods are pivoted together and rolling control when pivoted in opposition to each other. It was contemplated that as the angle of sweep of the hinged wing sections varied, the airplane center of gravity, due to movement of the mass of these wing sections and the engines, would substantially follow the movement of the airplane aerodynamic center and would maintain its relative longitudinal distance therefrom. Tests of this configuration, however, indicate longitudinal instability at relatively low angles of attack in the high sweep attitude and at moderate angles of attack in the low sweep attitude, lack of significant control due to engine pod deflection, and the possibility of complete loss of control in the event of engine failure; all of which pose major problems in making the "Swallow" planform operational.

The disappointing results of the test programs and studies mentioned hereinbefore resulted, over the past several years, in a general rejection of the variable wing sweep concept by the manufacturers and users of supersonic aircraft. In view of the potential of this concept, however, research efforts to solve the problems connected therewith were continued, resulting in the variable sweep wing aircraft configuration forming the subject matter of the present invention, and which is considered for the first time to provide a basis for a successful and fully operational design for an aircraft of this type.

Accordingly, it is an object of the present invention to provide a new and improved variable aspect ratio wing planform for an aircraft.

Another object of the instant invention is the provision of a new and improved variable sweep wing planform for a supersonic aircraft.

A still further object of the instant invention is the provision of a new and improved variable sweep wing planform for an aircraft operable to vary aspect ratio without adversely affecting the control and stability characteristics of the aircraft.

Another still further object of the present invention is the provision of a new and improved variable sweep wing planform for a supersonic aircraft for drastically varying aspect ratio, wherein accompanying minimal variation in the longitudinal position of the aerodynamic center of the wing is substantially offset by variation in instability attributable to a portion of the wing.

According to the present invention, the foregoing and other objects are attained by providing, in an aircraft having a conventional fuselage including a conventional aft empennage assembly and fuselage carried propulsion engines, wings projecting from the sides of the fuselage including fixed swept inboard panels constituting about 20 percent of the total wing area, with about one half of the area of the fixed panels being located forwardly of the aircraft center of gravity, and outboard panels extending outwardly from the fixed inboard panels and pivotally connected thereto for rotation in the wing areal plane to vary the leading edge sweep thereof between a small angle on the order of about 25 degrees and a large angle on the order of 75 to 80 degrees.

Figure 2:
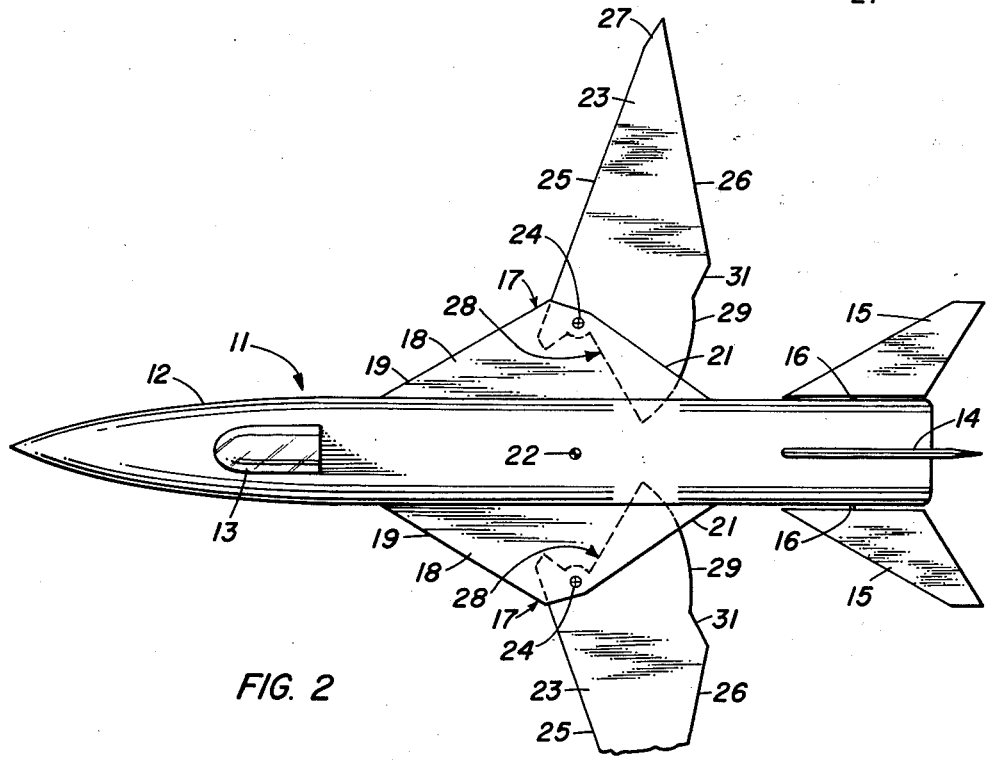

A more complete appreciation of the invention and many of the attendant advantages thereof will be readily apparent as the same becomes better understood by reference to the following detailed description when considered in connection with the accompanying drawing wherein:

FIG. 1 is a plan view of a variable wing sweep aircraft with the wings thereof disposed in a low aspect ratio, supersonic cruise position; and, FIG. 2 is a plan view of the aircraft of FIG. 1 with the wings thereof disposed in a high aspect ratio, subsonic takeoff, ascent, flight, descent, and landing attitude.

Referring now more particularly to the drawing, wherein like reference numerals designate identical parts throughout the several views, there is shown a variable sweep wing planform aircraft, generally designated by the reference numeral 11. Aircraft 11 is provided with a conventional fuselage 12 of the type having a reaction propulsion motor mounted therein, and which is proportioned to have a width to height ratio adequate for internal motor installation and a length to equivalent diameter, or fineness ratio, suitable for supersonic flight. A pilot's compartment is also included in fuselage 12 and is surmounted by a suitable canopy 13. A conventional empennage assembly including a vertical stabilizer member 14 projecting upwardly from the upper surface of fuselage 12 and swept horizontal stabilizer members 15 projecting outwardly from the sides of fuselage 12 is also provided, and is positioned aft adjacent the after end of the fuselage. The airfoil sections of these stabilizer members 14 and 15 are preferably of the supersonic family of symmetrical thin airfoils, and the horizontal stabilizer members 15 are of the "all movable" type; that is, each of the stabilizer members 15 is mounted to rotate about an axis extending transversely outwardly from the sides of the fuselage, entering the stabilizer member substantially normal to the root section at about the 50 percent station thereof, and running substantially coplanar with the mean planform plane of the member. More particularly, a suitable connection between each of the stabilizer members 15 and fuselage 12 may comprise an elongated cylindrical element 16 having its longitudinal axis collinear with the axis of rotation of the stabilizer member and having one end thereof rigidly connected to the stabilizer member root section. Substantially the entire lengths of the elements 16 are rotatably mounted within the fuselage 12; the gap between fuselage 12 and stabilizer members 15 having been exaggerated in the several views of the drawing to more clearly point out the all movable nature of these stabilizer members, and to show a small portion of the lengths of elements 16. The ends of the elements 16 within the fuselage are interconnected with a suitable conventional mechanism, not shown, operable to rotate the stabilizer members 15 about the longitudinal axes of elements 16 in either direction in unison to provide aircraft pitching control and also operable to rotate the members 15 about the longitudinal axes of elements 16 in either direction in opposition to provide rolling control of the aircraft. Preferably, the elements 16 are also made pivotal about their inner ends in a plane prependicular to the fuselage longitudinal axis, since it has been found that negative horizontal stabilizer dihedral deflection may provide significant variations in the longitudinal and directional stability characteristics of aircraft 11. It is not an object of the present invention, however, to provide suitable specific mechanism for rotating and deflecting the horizontal stabilizer members, and accordingly no such specific mechanism is herein disclosed.

Aircraft 11 is also provided with wings projecting outwardly from each side of the fuselage 12 and generally designated by the reference numeral 17. Each wing 17 includes a fixed inner panel 18 roughly triangular in planform, having a leading edge 19 swept at an angle on the order of about 60 degrees and terminating at a point located outboard of the fuselage axis of symmetry a distance substantially equal to the semispan of the horizontal stabilizer assembly comprising the members 15, and also having a tip section 21 running from the leading edge terminal point back to a point adjacent the side of fuselage 12 and rearwardly of the leading edge terminal point. The portion of each inner panel 18 adjacent the sides of fuselage 12 may be referred to as the panel root section, and the longitudinal location of the leading edge terminal point preferably falls between the longitudinal positions of the 50 and 60 percent stations of the panel root section, making the length of the tip section 21 somewhat less than the length of the leading edge 19. The 60 percent stations of the inner panel 18 root sections are also preferably positioned at substantially the longitudinal position of the aircraft center of gravity 22, which means that at least half and preferably somewhat more than half of the plan area of the fixed wing panels 18 is located forwardly thereof. Wings 17 also include outboard panels 23 which extend outwardly from the tip sections 21 of the inboard panels 18 and which are suitably connected thereto for rotation in the wing planform plane about a pivot point 24 located within the perimeter of each inboard panel 18 to vary the sweep angle of the straight leading edge 25 of the panels 23. The wing outboard panels 17 are shown in the low aspect ratio, supersonic flight position in FIG. 1 of the drawing. In this position, the leading edge 25 of each wing panel 23 commences at the terminal point of the leading edge 19 of the adjacent inboard wing panel 18, and extends rearwardly and outwardly at a sweep angle of approximately 75 degrees. Each wing panel 23 is also provided with a straight trailing edge 26 which extends rearwardly and outwardly from the tip section 21 of the adjoining wing panel 18 from a point closely adjacent the 100 percent station thereof, at a sweep angle of approximately 45 to 50 degrees. It is also contemplated that the leading edge 25 of each panel 23 could be made with a maximum sweep angle considerably higher than that shown, with appropriate modification of the aircraft structure as illustrated to accommodate these higher sweep angles. Each panel 23 is also provided, by way of example, with a tip section 27 running rearwardly from the leading edge 25 toward the trailing edge 26, with the interior angle between the leading edge 25 and tip section 27 on the order of 170 degrees, although other suitable tip arrangements are considered to be within the scope of the invention. The outermost extremity of the wings 17 occurs generally at the intersection of the outboard panel tip sections 27 and the trailing edges 26, and the semispan of the wing in the low aspect ratio position described may generally be on the order of one and one-quarter to one and one-third the semispan of the horizontal stabilizer assembly defined by the members 15. The aspect ratio of the wings 17 in the highly swept position described will be on the order of 2.0.

The outboard wing panels 17 may be swept forward about the pivot points 24 from the hereinbefore described highly swept position to the high aspect ratio position shown in FIG. 2 of the drawing. In this position, the sweep angle of the panel leading edge 25 is decreased to about 25 degrees. The basic structural arrangement of the wing panels which makes feasible this variation in sweep angle will now be described. The inner wing panels 18 are each preferably made somewhat thicker than is strictly necessary from the aerodynamic viewpoint, and a medial recess is provided between the upper and lower surfaces thereof. A medial slot running along the length of the tip sections 21 provides access to each medial inner wing panel recess. Each outer wing panel 23 includes a rigid portion, generally designated by the reference numeral 28, which is coplanar with the hereinbefore described portion of the panel bounded by leading edge 25, trailing edge 26, and tip section 27, and which extends into the medial recess formed in the adjoining inner panel 18 through the medial slot in the tip section 21 thereof. At least this portion 28 of the outer wing panel 23 must be thin enough to move in and out of the slot in the tip section 21, although the remainder of the panel may be made thicker. Suitable structural connections are provided to secure portion 28 of each wing panel 23 within the recess in the adjacent panel 18 in such a manner that it is free to rotate about the pivot point 24, within the limits defined hereinbefore. The pivot point 24 is located at about the 25 percent station of each tip section 21, and consequently on about the 25 percent chord line of the panels 23, and is further positioned closely proximate the edge of tip section 21, which may be angled somewhat outwardly at this point, as shown in the drawing, to accommodate the pivot point. It will now be apparent that as the outboard wing panels 23 are swept forward, some portion of the outboard panel leading edge 25 must enter the recesses in the inboard wing panels 18, and consequently at least this portion of the outboard wing panel wing leading edge and leading edge section must be sufficiently thin for this purpose. Accordingly, it may be deemed preferable to limit the maximum thickness of the panels 23 to the thickness of the slots in the tip sections 21, as indicated in the drawing, but it is not strictly necessary that this be done. The greatest area of the outboard wing panel portions 28 which is movable within the inboard panel recesses is somewhat fan-shaped and is formed as a radial segment of a circle having its center at a pivot point 24 and a circular outer boundary 29. The distance between pivot point 24 and boundary 29 may, in some cases, be as great or greater than the distance from the pivot point to the root end of the outboard panel trailing edge 26, taken in the highly swept position of FIG. 1, but should not exceed the distance between the pivot points 24 and the longitudinal axis of symmetry of the aircraft. Accordingly, in the aircraft and wing configuration illustrated in the drawing, the radius of boundary 29 is less than the distance between the pivot points 24 and the root ends of the trailing edges 26, and therefore a step portion 31 running between these points on each of the wing panels 23 has been provided. The radial width of the fan-shaped areas of panel portions 28 is such that, as the wing panels 23 are positioned in the swept forward attitude, some part thereof remains in the recesses in inner wing panels 18 while the remainder serves to increase the area of the wings 17. In their swept forward position, the aspect ratio of the wings 17 hereinbefore described will be on the order of 6.0.

The actual construction of the wing panel pivotal connections, as well as the mechanism necessary to effect pivotal movement of the outboard wing panels 23, is not considered to form part of the present invention, and has been omitted in the interest of clarity. The showing of control surfaces and the like on the outboard wing panels 23 has also been omitted; however, such surfaces may be required in actual practice of the invention.

A salient feature of the present invention is considered to be the simplicity of the foregoing structural arrangement of the variable sweep wings, with which adequate longitudinal and direction stability is obtained in both the high and low aspect ratio position, and which is also conducive of the use of the aft empennage arrangement to secure adequate control characteristics. The one absolutely essential feature in the configuration is the fixed inboard wing panel having at least a sizeable portion of its area positioned forwardly of the aircraft center of gravity. It is this portion of the fixed inboard wing panels which makes possible the attainment of the extremely desirable stability characteristics exhibited by the aircraft configuration of the present invention; that is, the maintenance of essentially the same longitudinal stability level for both the high and low wing sweep positions. The area of the portions of panels 18 positioned forwardly of the aircraft center of gravity, of course, contributes to aircraft instability even when the outboard wing panels 23 are swept forward, which may, however, be readily counterbalanced by normal sized aft stabilizer surfaces. As the sweep of the outboard wing panels is increased, the resulting decrease in aspect ratio and wing area, and the increase in sweep, combine to decrease the relative portion of the total lift developed on the outboard wing panels 23, and thereby increasing the relative portion of the total lift carried on the portions of the fixed inboard panels 18 positioned forwardly of the aircraft center of gravity. The instability contributed by these portions of panels 18 is thereby increased and, for the configuration hereinbefore described, counteracts the increase in longitudinal stability associated with the rearward rotation of the outboard wing panels 23. It will be readily apparent, therefore, that without the provision of the wing fixed inboard panels the aircraft in the low aspect ratio attitude would become so stable that control without the provision of extremely large stabilizer surfaces would be unobtainable. Further, the shift in relative position of the aerodynamic center and center of gravity of the aircraft configuration herein disclosed as the outboard panels rotate is minimized by the placement of the pivot points therefor as far outboard on the inner wing panels 18 as they can be located, as clearly indicated hereinbefore, providing almost straight inboard movement of the center of lift.

The operational advantages and the adaptability of the aircraft configuration hereinbefore described will now be apparent, as will be obviousness of utilizing this configuration for aircraft designed for various purposes. When used as the basis for the design of supersonic transport aircraft, the high aspect ratio of 6.0 obtained with the swept forward wing position can be expected to result in high performance during takeoff and landing, as well as minimizing fuel consumption during subsonic climb to cruise altitude. Improved holding capability and performance during descent at destination may also be expected. For supersonic cruise, the aspect ratio of 2.0 obtained with the wings in the fully swept position can be expected to minimize drag, while developing adequate lift. These advantages may be also obtained by similar aircraft designed to perform various military operational missions. For example, attack aircraft may readily perform very low level missions at supersonic speeds, due to the minimal effects of atmospheric turbulence upon the wings when deployed in the low aspect ratio position. This configuration is also believed to be well suited to the design of interceptor aircraft, either land or carrier based, which may cruise at altitude in the high aspect ratio attitude in subsonic speeds to conserve fuel and prolong the time it may spend in flight, while being in a position to convert to the low aspect ratio, supersonic attitude immediately upon recognizance of the necessity of intercepting enemy aircraft.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An aircraft comprising a fuselage, propulsion means carried by said fuselage, an empennage assembly carried by said fuselage adjacent the after end thereof and including substantially horizontally disposed stabilizer members operable to provide aircraft pitching and rolling control, a wing connected to each side of said fuselage and projecting substantially horizontally and outwardly therefrom, each of said wings including an inboard wing panel and an outboard wing panel, each of said inboard wing panels being fixedly positioned with respect to said fuselage with at least half the planform area of each of said inboard wing panels located forwardly of the center of gravity of said aircraft, each of said inboard wing panels having a leading edge swept outwardly and rearwardly with respect to the adjacent side of said fuselage with an outboard and rearward extremity positioned forwardly of said aircraft center of gravity and each of said inboard wing panels having a substantially straight tip section extending from the leading edge extremity thereof inwardly and rearwardly with respect to the adjacent side of said fuselage with an inboard and rearward extremity located abaft said aircraft center of gravity, the distance between the forwardmost extremities of said inboard wing panel leading edges and said aircraft center of gravity being greater than the distance between said inboard wing panel rearward extremities and said aircraft center of gravity, each of said outboard wing panels being connected on about the 25 percent chord line thereof to the adjacent inboard wing panel for rotation between a low sweep high aspect ratio position and a high sweep low aspect ratio position within predetermined limits in a substantially horizontal plane about a pivot point located on the inboard wing panel closely proximate the tip section thereof at about the 25 percent station of the tip section, each of said outboard wing panels when in the high sweep low aspect ratio position having a straight trailing edge portion which extends rearwardly and outwardly from the tip of each of said fixed wing panel from a point closely adjacent the 100 percent station thereof, the planform area of said inboard wing panels comprising substantially 20 percent of the total planform area of said wings.

2. The aircraft as defined in claim 1, wherein the length to chord distance ratio of said outboard wing panels is such that the wing aspect ratio obtained when said outboard wing panels are in said low sweep high aspect ratio position within said predetermined limits is substantially treble the wing aspect ratio obtained when said outboard wing panels are in said high sweep low aspect ratio position within said limits.

3. The aircraft as defined in claim 1, wherein the wing aspect ratio obtained when said outboard wing panels are positioned in said low sweep high aspect ratio position is on the order of 6.0, and the wing aspect ratio obtained when said outboard wing panels are positioned in said high sweep low aspect ratio position is on the order of 2.0.

4. The aircraft as defined in claim 1, wherein the total planform area of said wing is a maximum when said outboard wing panels are positioned in their most forwardly swept attitude.

References Cited in the file of this patent

UNITED STATES PATENTS

| | | |
|---|---|---|
| 2,621,871 | Robert | Dec. 16, 1952 |
| 2,670,910 | Hill | Mar. 2, 1954 |